(12) United States Patent
Hong

(10) Patent No.: US 12,075,306 B2
(45) Date of Patent: *Aug. 27, 2024

(54) METHOD AND DEVICE FOR UNMANNED AERIAL VEHICLE HANDOVER AND BASE STATION

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/137,377

(22) Filed: Apr. 20, 2023

(65) Prior Publication Data

US 2024/0040464 A1 Feb. 1, 2024

Related U.S. Application Data

(63) Continuation of application No. 16/761,214, filed as application No. PCT/CN2017/110538 on Nov. 10, 2017.

(51) Int. Cl.
*H04W 4/00* (2018.01)
*B64C 39/02* (2023.01)
(Continued)

(52) U.S. Cl.
CPC ........... *H04W 36/32* (2013.01); *B64C 39/024* (2013.01); *B64F 1/22* (2013.01); *H04W 36/0005* (2013.01); *H04W 36/08* (2013.01); *B64U 10/13* (2023.01)

(58) Field of Classification Search
CPC . H04W 36/32; H04W 36/0005; H04W 36/08; B64C 39/024; B64F 1/22; B64U 10/13
(Continued)

(56) References Cited

U.S. PATENT DOCUMENTS 7,957,349 B2 6/2011 Kim et al.
9,137,675 B2 9/2015 Rubin et al.
(Continued)

FOREIGN PATENT DOCUMENTS

CN 104349409 A 2/2015
CN 105228200 A 1/2016
(Continued)

OTHER PUBLICATIONS

European extended search report issued in EP17931304.4, dated Oct. 28, 2020, (14p).
(Continued)

*Primary Examiner* — Amancio Gonzalez
(74) *Attorney, Agent, or Firm* — Arch & Lake LLP

(57) ABSTRACT

This disclosure provides a method unmanned aerial vehicle handover, a base station, and a non-transitory computer readable storage medium. The method for unmanned aerial vehicle handover includes: when base stations meeting handover conditions are determined based on a measurement report sent by an unmanned aerial vehicle, determining whether there is a candidate base station that has completed a handover preparation existed among the base stations meeting the handover conditions; and when there is a candidate base station that has completed the handover preparation existed among the base stations meeting the handover conditions, handing over the unmanned aerial vehicle to the candidate base station meeting the handover conditions.

20 Claims, 7 Drawing Sheets

(51) Int. Cl.
*B64F 1/22* (2006.01)
*H04W 36/00* (2009.01)
*H04W 36/08* (2009.01)
*H04W 36/32* (2009.01)
*B64U 10/13* (2023.01)

(58) Field of Classification Search
USPC .......................................................... 370/331
See application file for complete search history.

(56) References Cited

U.S. PATENT DOCUMENTS

| | | | |
|---|---|---|---|
| 10,772,018 B2* | 9/2020 | Yeh | H04L 43/16 |
| 10,810,893 B2* | 10/2020 | Yoshizawa | B64D 47/00 |
| 10,827,019 B2* | 11/2020 | Rubin | H04W 12/009 |
| 10,912,020 B2 | 2/2021 | Kim | |
| 10,924,171 B2 | 2/2021 | Wei et al. | |
| 11,076,328 B2* | 7/2021 | Lu | H04W 24/00 |
| 11,197,341 B2 | 12/2021 | Velev et al. | |
| 11,218,934 B2* | 1/2022 | Hong | H04W 36/083 |
| 11,250,712 B2* | 2/2022 | Yoshizawa | H04W 36/0058 |
| 11,265,749 B2 | 3/2022 | Zhang et al. | |
| 2010/0330999 A1 | 12/2010 | Larsson et al. | |
| 2016/0161258 A1 | 6/2016 | Magson et al. | |
| 2017/0187450 A1 | 6/2017 | Jalai | |
| 2017/0215121 A1 | 7/2017 | Condeixa et al. | |
| 2019/0289505 A1* | 9/2019 | Thomas | H04W 36/08 |
| 2020/0068451 A1 | 2/2020 | Attila et al. | |
| 2020/0192348 A1* | 6/2020 | Koziol | G08G 5/0013 |
| 2020/0236573 A1* | 7/2020 | Zhang | B64C 39/024 |
| 2020/0314933 A1* | 10/2020 | Tang | H04L 5/001 |
| 2021/0014765 A1 | 1/2021 | Shan et al. | |
| 2021/0112515 A1* | 4/2021 | Zou | H04B 7/18504 |
| 2021/0195479 A1* | 6/2021 | Wei | H04W 76/27 |
| 2021/0195496 A1* | 6/2021 | Hong | G05D 1/101 |
| 2021/0256855 A1* | 8/2021 | Hong | H04W 36/0016 |
| 2021/0274565 A1* | 9/2021 | Chang | H04W 48/20 |
| 2021/0297921 A1 | 9/2021 | Pragada et al. | |

FOREIGN PATENT DOCUMENTS

| | | |
|---|---|---|
| CN | 105682158 A | 6/2016 |
| CN | 107005907 A | 8/2017 |
| WO | 2014089051 A1 | 6/2014 |
| WO | 2017020253 A1 | 2/2017 |

OTHER PUBLICATIONS

Nokia et al., :Potential mobility enhancements for UAVs, 3GPP TSG-RAN WG2 #99bi, R2-1711445 Resubmission of R2-1708667, Prague, Czech Republic; Oct. 9-13, 2017, (2p).

Sony, "Discussion on measurement for Aerial Vehicles handover", 3GPP TSG RAN WG2 Meeting #99b, R2-1711027, Prague, Czech Republic, Oct. 9-13, 2017, (4p).

First Chinese Office Action issued in CN201780001843.5, dated Aug. 5, 2020, with English translation, (16p).

Lenovo, et al., "Consideration for potential mobility enhancement for aerial UE", 3GPP TSG-RAN WG2 Meeting#99bis R2-1711377 Revision of R2-1708975, Prague, Czech, Oct. 9-13, 2017,(6p).

Interational Search Report and Written Opinion issued in PCT/CN2017/110538, dated Mar. 3, 2018, with English translation,(8p).

* cited by examiner

METHOD AND DEVICE FOR UNMANNED AERIAL VEHICLE HANDOVER AND BASE STATION

CROSS-REFERENCE TO RELATED APPLICATIONS

This application is a continuation application of U.S. application Ser. No. 16/761,214, which is the national phase application of PCT Application No. PCT/CN2017/110538, filed on Nov. 10, 2017, the entire contents of which are incorporated herein by reference for all purposes.

TECHNICAL FIELD

The present disclosure relates to the technical field of wireless communication, and in particular, to a method and a device for unmanned aerial vehicle handover, and a base station.

BACKGROUND

Unmanned Aerial Vehicles (UAVs) have been applied to some specific scenes to perform tasks such as aerial photography, unmanned detection and reconnaissance, measurement and surveying, highway surveying, city planning, ecological environmental monitoring, scientific investigation, oil exploration, aerial remote sensing, frontier patrol, forest fire prevention, disaster assessment, and the like.

In order to further expand the application range of the unmanned aerial vehicle, the 3rd Generation Partnership Project (3GPP) proposes a study that services meeting the requirements for the unmanned aerial vehicle provided by the cellular network become more standardized in a discussion of the Project of "enhanced support of unmanned aerial vehicles", and the cellular network is considered to determine a flight path of the unmanned aerial vehicle in advance, so that it is helpful to improve mobility of the unmanned aerial vehicle, for example, improving success rate and speed rate of handover.

SUMMARY

In order to solve the problems in the related art, embodiments of the present disclosure provide a method and a device for unmanned aerial vehicle handover, and a base station, so that the base station can determine a handover candidate base station based on a flight path of the unmanned aerial vehicle, and perform a handover preparation operation with the handover candidate base station in advance, thereby implementing fast handover to the handover candidate base station meeting conditions when the unmanned aerial vehicle needs to be handed over.

According to a first aspect of the present disclosure, a method for unmanned aerial vehicle handover applied to a source base station is provided. The method includes:
 in response to base stations meeting handover conditions being determined based on a measurement report sent by an unmanned aerial vehicle, determining whether there is a candidate base station that has completed a handover preparation existed among the base stations meeting the handover conditions; and
 in response to there is a candidate base station that has completed the handover preparation existed among the base stations meeting the handover conditions, handing over the unmanned aerial vehicle to the candidate base station meeting the handover conditions.

In one embodiment, determining whether there is a candidate base station that has completed the handover preparation existed among the base stations meeting the handover conditions, includes:
 determining whether any of the base stations meeting the handover conditions is in a handover candidate base station set, wherein base stations in the handover candidate base station set are base stations that has completed the handover preparation; and
 if any of the base stations meeting the handover conditions is in the handover candidate base station set, determining that there is a candidate base station that has completed handover preparation existed among the base stations meeting the handover conditions.

According to a second aspect of the present disclosure, a device for unmanned aerial vehicle handover applied to a source base station is provided. The device includes:
 a first determination module configured to determine whether there is a candidate base station that has completed a handover preparation existed among the base stations meeting the handover conditions, in response to base stations meeting handover conditions being determined based on a measurement report sent by an unmanned aerial vehicle; and
 a first handover module configured to hand over the unmanned aerial vehicle to the candidate base station meeting the handover conditions, the first determination module determines that when the candidate base station that has completed the handover preparation exists in the base stations meeting the handover conditions.

According to a third aspect of the present disclosure, a base station is provided. The base station includes: a processor and a memory for storing processor-executable instructions. The processor is configured to:
 determine whether there is a candidate base station that has completed a handover preparation existed among the base stations meeting the handover conditions, when base stations meeting handover conditions are determined based on a measurement report sent by an unmanned aerial vehicle; and
 hand over the unmanned aerial vehicle to the candidate base station meeting the handover conditions, when there is a candidate base station that has completed the handover preparation existed among the base stations meeting the handover conditions.

According to a fourth aspect of the present disclosure, a non-transitory computer readable storage medium having computer instructions stored thereon is provided. The instructions are executed by a processor to perform the following steps of:
 determining whether there is a candidate base station that has completed a handover preparation existed among the base stations meeting the handover conditions, when base stations meeting handover conditions are determined based on a measurement report sent by an unmanned aerial vehicle; and
 handing over the unmanned aerial vehicle to the candidate base station meeting the handover conditions, when there is a candidate base station that has completed the handover preparation existed among the base stations meeting the handover conditions.

It should be understood that the foregoing general description and the following detailed description are merely exemplary and explanatory, and are not restrictive of the present disclosure.

BRIEF DESCRIPTION OF THE DRAWINGS

The accompanying drawings, which are incorporated in and constitute part of this specification, illustrate embodiments consistent with the present disclosure and together with the description, serve to explain the principles of the present disclosure.

DETAILED DESCRIPTION

Figure 1A:
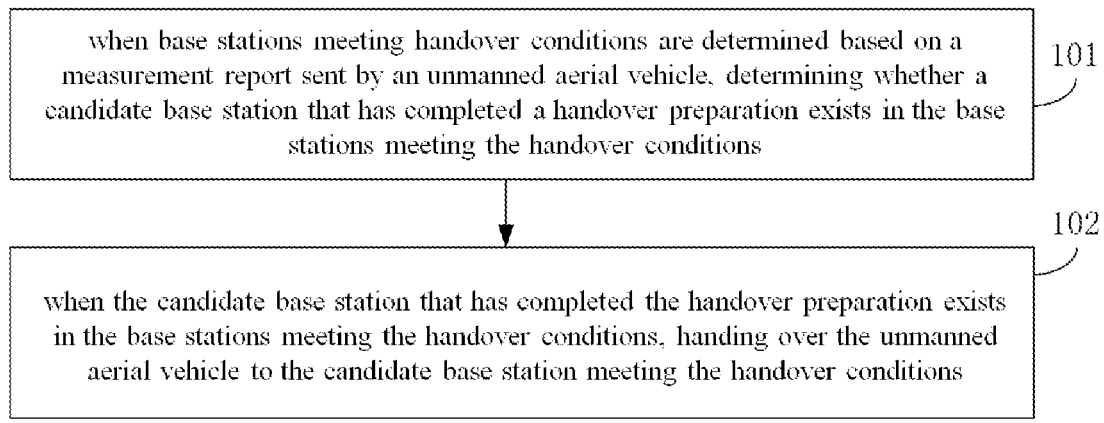
FIG. 1A is a flow chart showing a method for unmanned aerial vehicle handover according to an embodiment.

Embodiments will be described in detail herein, examples of which are illustrated in the drawings. When the following description refers to the drawings, the same numbers in different drawings represent the same or similar elements, unless otherwise indicated. The implementations described in the following embodiments do not represent all implementations consistent with the present disclosure. Instead, the embodiments are merely examples of devices and methods consistent with aspects of the present disclosure as described in detail in the appended claims.

The technical solutions provided by the embodiments of the present disclosure may include beneficial effects below.

The source base station may determine whether a candidate base station that has completed handover preparation exists in the base stations meeting handover conditions while receiving a measurement report sent by the unmanned aerial vehicle, and if so, the unmanned aerial vehicle may be directly handed over to the candidate base station meeting the handover conditions, that is, a RRC connection reconfiguration signaling may be directly sent to the unmanned aerial vehicle, to realize fast handover of the unmanned aerial vehicle to the candidate base station that has completed the handover preparation, and facilitate the base station for improving mobility of the unmanned aerial vehicle based on the flight path.

In this disclosure, the unmanned aerial vehicle is a cellular network unmanned aerial vehicle accessed into a cellular network.

Figure 1B:
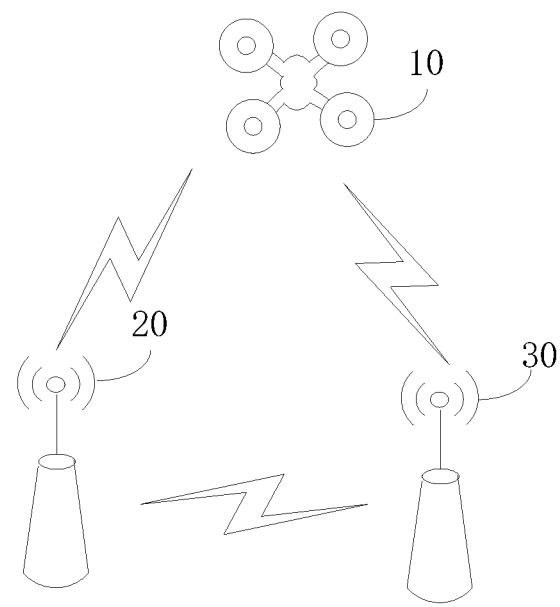
FIG. 1B is a scene diagram showing a method for unmanned aerial vehicle handover according to an embodiment.

FIG. 1A is a flow chart showing a method for unmanned aerial vehicle handover according to an embodiment, and FIG. 1B is a scene diagram showing a method for unmanned aerial vehicle handover according to an embodiment, and the method for unmanned aerial vehicle handover can be applied to a source base station. As shown in FIG. 1A, the method for unmanned aerial vehicle handover includes the following steps 101-102.

In step 101, when base stations meeting handover conditions are determined based on a measurement report sent by an unmanned aerial vehicle, whether a candidate base station that has completed a handover preparation exists in the base stations meeting the handover conditions is determined.

In one embodiment, when the source base station receives the measurement report, the base station meeting the handover conditions may be determined based on the signal quality of each of the base stations, and if a signal received power is greater than −65 dB, it shows that the base station has a very high coverage strength level at a position where the unmanned aerial vehicle is located, and is a base station meeting the handover conditions.

In one embodiment, the candidate base station that has completed handover preparation refers to a base station that has accepted a handover request initiated by the source base station. For example, if the source base station sends a HANDOVER REQUEST signaling to the base station through an X2 interface connection and receives a HANDOVER REQUEST ACKNOWLEDGE signaling from the base station, the base station may be determined as a candidate base station that has completed the handover preparation; or, the source base station sends HANDOVER REQUIRED signaling to a Mobility Management Entity (MME) through an S1 interface, and monitors a HANDOVER COMMAND signaling returned by the MME, so that the source base station may be determined as a candidate base station that has completed the handover preparation.

In one embodiment, the candidate base station may be recorded in a handover candidate base station set, and whether a candidate base station that has completed the handover preparation exists in the base stations meeting the handover conditions is determined by determining whether any of the base stations meeting the handover conditions exists in the handover candidate base station set. If any of the base stations meeting the handover conditions is located in the handover candidate base station set, the candidate base station that has completed handover preparation exists in the base stations meeting the handover conditions will be determined. For example, if the candidate base stations include a base station 1, a base station 2, and a base station 3, and the base stations meeting the handover conditions include the base station 1, it means that the base station 1 meeting the handover conditions is the candidate base station that has completed handover preparation.

In step 102, when the candidate base station that has completed the handover preparation exists in the base stations meeting the handover conditions, the unmanned aerial vehicle is handed over to the candidate base station meeting the handover conditions.

In one embodiment, since the source base station has already sent a handover request to the candidate base station and monitored a signaling for indicating that the handover preparation is successful, a Radio Resource Control (RRC) connection reconfiguration signaling (i.e., RRCConnectionReconfiguration) signaling may be directly send to the unmanned aerial vehicle, indicating the unmanned aerial vehicle to be handed over to the candidate base station.

In an exemplary scene, as shown in FIG. 1B, in the scene shown in FIG. 1B, an unmanned aerial vehicle 10, a source base station 20, at least one candidate base station 30, and the like are included, wherein after the source base station 20 acquires a flight path of the unmanned aerial vehicle 10, it is possible to acquire geographical location information of each of the adjacent base stations, further to determine an accessible base station when the unmanned aerial vehicle 10 flies according to the flight path, and then to determine the base stations in which the handover preparation operation is to be performed based on a flight information of the unmanned aerial vehicle 10, such as a flight speed and a flight altitude, to initiate a handover request to each of the base stations in which the handover preparation operation is to be performed to perform the handover preparation operation, and to determine the base station that has successfully performed the handover preparation as a candidate base station 30 that has completed the handover preparation, so that when the unmanned aerial vehicle reports the measurement report, if it is determined based on the measurement report that the candidate base station 30 that has completed the handover preparation exists in the base stations meeting the handover conditions, the unmanned aerial vehicle may be directly instructed to be quickly handed over to the candidate base station 30 meeting the handover conditions, and the mobility performance of the unmanned aerial vehicle 10 can be improved.

According to the above steps 101 to 102 of this embodiment, the source base station may determine whether the candidate base station that has completed handover preparation exists in the base stations meeting the handover conditions while receiving the measurement report sent by the unmanned aerial vehicle, and if so, the unmanned aerial vehicle may be directly handed over to the candidate base station meeting the handover conditions, that is, a RRC connection reconfiguration signaling may be directly sent to the unmanned aerial vehicle, so as to realize fast handover of the unmanned aerial vehicle to the candidate base station that has completed the handover preparation, and facilitate the base station for improving mobility of the unmanned aerial vehicle based on the flight path.

Following embodiments are referred to specifically describe how to perform the unmanned aerial vehicle handover.

The technical solutions provided by the embodiments of the present disclosure will be described below with reference to the specific embodiments.

Figure 2:
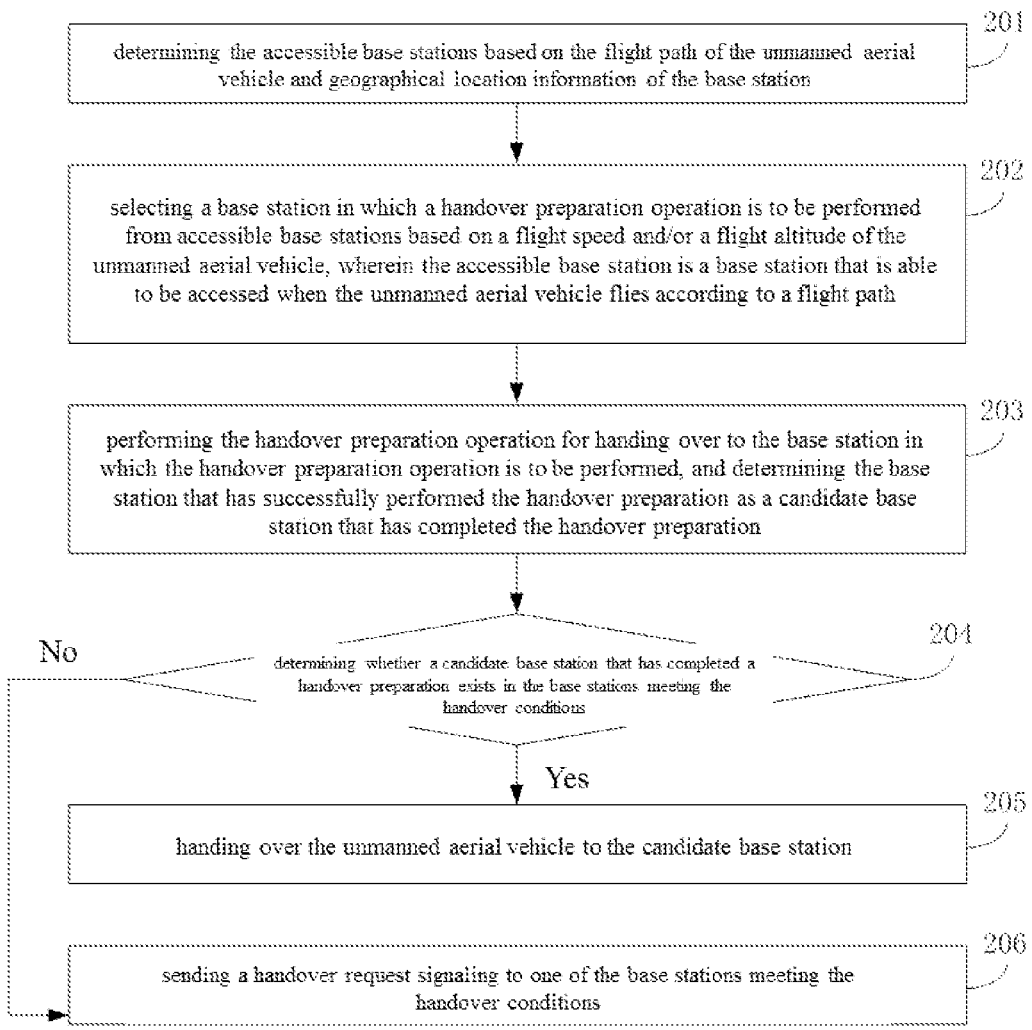
FIG. 2 is a flow chart showing another method for unmanned aerial vehicle handover according to an embodiment.

FIG. 2 is a flow chart showing another method for unmanned aerial vehicle handover according to an embodiment. In this embodiment, by using the above method provided by the embodiment of the present disclosure, exemplary description is provided as an example of how the source base station determining the candidate base station, as shown in FIG. 2, the method includes the following steps.

In step 201, an accessible base station is determined based on the flight path of the unmanned aerial vehicle and the geographical location information of the base station.

In one embodiment, the base station may acquire a flight path of the unmanned aerial vehicle from the core network equipment, and the flight path may be composed of a plurality of coordinate points or may also be indicated by a two-dimensional grid map.

In one embodiment, after the base station acquires the flight path of the unmanned aerial vehicle, it may determine which one of the adjacent base stations of the source base station is an accessible base station that may possibly serve for the unmanned aerial vehicle, based on the flight path of the unmanned aerial vehicle and the geographical location information of each of the base stations, for example, a position identified by the geographical location information of the base station through which the flight path of the unmanned aerial vehicle passes, or it may be determined that its coverage area includes a part of the flight path of the unmanned aerial vehicle based on the geographical location information of the adjacent base stations, or the like, that is, it may be determined which adjacent base stations are accessible base stations of the unmanned aerial vehicle, wherein next accessible base station of the unmanned aerial vehicle is not limited to one.

In one embodiment, the source base station of the adjacent base stations may acquire the geographical location information of each of the base stations in the following three manners.

A first manner: interacting the geographical location information of the base station with the adjacent base stations, based on interfaces between the base stations.

In one embodiment, the source base station may interact with the adjacent base stations through the interfaces between the base stations, such as an X2 interface, to determine the geographical location information with respect to each other.

A second manner: acquiring geographical location information of each of the adjacent base stations from a core network equipment.

In one embodiment, the source base station may send a request for acquiring the geographical location information of each of the adjacent base stations to the core network equipment through an S1 interface, thereby acquiring the geographical location information of each of the adjacent base station from the core network equipment.

A third manner: inquiring the geographical location information of each of the adjacent base stations through a network management system of an operator.

In one embodiment, the source base station may inquire the geographical location information of each of the adjacent base stations through an Operation, Administration and Maintenance (hereinafter referred as "OAM") system of an operator.

In step 202, based on the flight speed and/or the flight altitude of the unmanned aerial vehicle, a base station in which the handover preparation operation is to be performed is selected from the accessible base stations, and the accessible base station is a base station that is accessible when the unmanned aerial vehicle flies according to the flight path.

In one embodiment, the flight speed and/or the flight altitude of the unmanned aerial vehicle may be reported to the source base station by the unmanned aerial vehicle after accessing to the source base station.

In one embodiment, the source base station may select a first number of base stations in which the handover preparation operation is to be performed to perform the handover preparation operation in a forward direction of the unmanned aerial vehicle from the accessible base stations based on the flight speed of the unmanned aerial vehicle. A specific numerical value of the first number is associated with the flight speed. For example, if the flight speed of the unmanned aerial vehicle is faster, three base stations in the forward direction of the unmanned aerial vehicle may be selected as the base stations in which the handover preparation operation is to be performed; if the flight speed of the unmanned aerial vehicle is medium, two base stations in the forward direction of the unmanned aerial vehicle may be selected as the base stations in which the handover preparation operation is to be performed; and if the flight speed of the unmanned aerial vehicle is slower, one base station in the forward direction of the unmanned aerial vehicle may be selected as the base station in which the handover preparation operation is to be performed. Corresponding relationship of the flight speed to the number of base stations in which the handover preparation operation is to be performed may be set in advance, or may be calculated by the source base station.

In one embodiment, the source base station may select a second number of base stations in which the handover preparation operation is to be performed to perform the handover preparation operation in a forward direction of the unmanned aerial vehicle from the accessible base stations based on the flight altitude of the unmanned aerial vehicle. A specific numerical value of the second number is associated with the flight altitude. For example, if the flight altitude of the unmanned aerial vehicle is lower, one base station in the forward direction of the unmanned aerial vehicle may be selected as the base station in which the handover preparation operation is to be performed; if the flight altitude of the unmanned aerial vehicle is medium, two base stations in the forward direction of the unmanned aerial vehicle may be selected as base stations in which the handover preparation operation is to be performed; and if the flight altitude of the unmanned aerial vehicle is higher, two base stations in the forward direction of the unmanned aerial vehicle may be selected as the base stations in which the handover preparation operation is to be performed. The corresponding relationship of the flight altitude to the number of base stations in which the handover preparation operation is to be performed may be set in advance, or may be calculated by the source base station.

In one embodiment, the source base station may select a third number of base stations in which the handover preparation operation is to be performed to perform the handover preparation operation in the forward direction of the unmanned aerial vehicle from the accessible base stations based on the flight speed and the flight altitude of the unmanned aerial vehicle. A specific numerical value of the third number is associated with the flight altitude and the flight speed. For example, if the flight altitude of the unmanned aerial vehicle is higher and the flight speed thereof is faster, two base stations in the forward direction of the unmanned aerial vehicle may be selected as the base stations in which the handover preparation operation is to be performed, and if the flight altitude of the unmanned aerial vehicle is medium but the flight speed thereof is slower, one base station in the forward direction of the unmanned aerial vehicle may be selected as the base station in which the handover preparation operation is to be performed.

In one embodiment, the system may predetermine a criterion or algorithm to determine the number of base stations in which the handover preparation operation is to be performed based on the flight speed and/or flight altitude of the unmanned aerial vehicle.

In step 203, the handover preparation operation for handing over to the base station in which the handover preparation operation is to be performed is performed, and the base station that has successfully performed the handover preparation is determined as a candidate base station that has completed the handover preparation.

Figure 3:
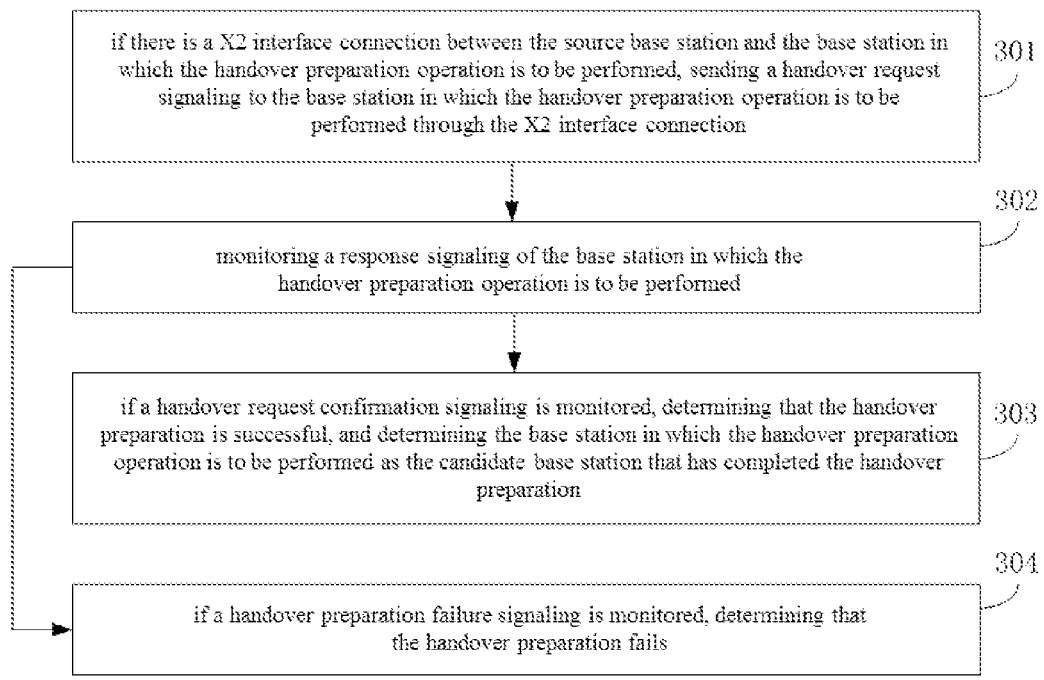
FIG. 3 is a flow chart showing still another method for unmanned aerial vehicle handover according to an embodiment.
Figure 4:
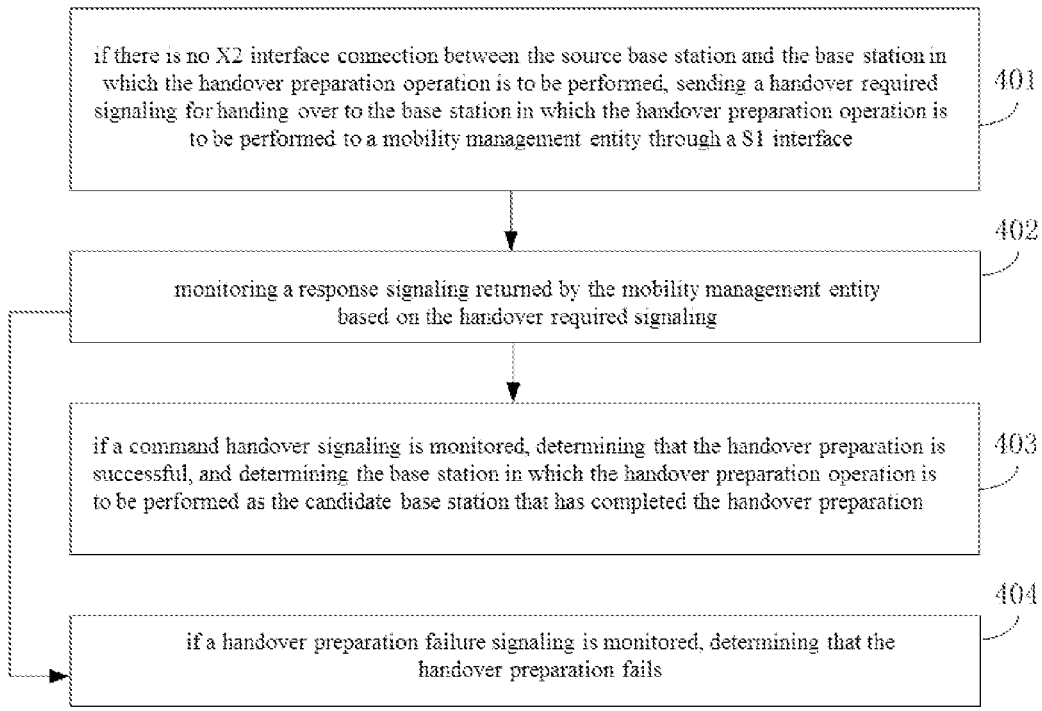
FIG. 4 is a flow chart showing yet another method for unmanned aerial vehicle handover according to an embodiment.

In one embodiment, the method for performing the handover preparation operation can refer to the embodiments shown in FIG. 3 and FIG. 4, which will not be described in detail herein.

In step 204, when the base stations meeting the handover conditions are determined based on the measurement report sent by the unmanned aerial vehicle, whether the candidate base station that has completed the handover preparation exists in the base stations meeting the handover condition is determined. Step 205 is performed when the candidate base station that has completed the handover preparation exists in the base stations meeting the handover conditions, and step 206 is performed when no candidate base station that has completed the handover preparation exists in the base stations meeting the handover conditions.

In step 205, the unmanned aerial vehicle is handed over to the candidate base station meeting the handover conditions.

In one embodiment, the descriptions of step 204 and step 205 can refer to the descriptions of step 101 and step 102 of the embodiment shown in FIG. 1A, which will not be described in detail herein.

In step 206, a handover request signaling is sent to one of the base stations meeting the handover condition.

In one embodiment, if no candidate base station that has completed handover preparation exists in the base stations meeting the handover conditions, a handover request signaling may be sent to one base station with the highest signal quality in the base stations meeting the handover conditions, that is, when there is an X2 interface connection between the source base station and the base station with the highest signal quality, a HANDOVER REQUEST signaling may be sent to the base station with the highest signal quality through the X2 interface connection; and when there is no X2 interface between the source base station and the base station with the highest signal quality, a HANDOVER REQUIRED signaling is send to the MME through an S1 interface.

In this embodiment, three implementing manners in which the source base station acquires the geographical location information of other base stations are disclosed to facilitate the base station to flexibly determine the accessible base station when the unmanned aerial vehicle flies according to the flight path, and determine the number of base stations in which the handover preparation operation is to be performed based on the flight speed and/or the flight altitude of the unmanned aerial vehicle, so that it is helpful for the source base station to determine which base station to which the unmanned aerial vehicle may be handed over and thereby performing the handover preparation based on the actual flight information of the unmanned aerial vehicle, and the mobility of the unmanned aerial vehicle can be improved.

FIG. 3 is a flow chart showing still another method for unmanned aerial vehicle handover according to an embodiment. In this embodiment, by using the above method provided by the embodiment of the present disclosure, an exemplary description is provided as an example of how the source base station performs the handover preparation on the base station in which the handover preparation operation is to be performed, having an interface between the base stations. As shown in FIG. 3, the method includes the following steps.

In step 301, if there is an X2 interface connection between the source base station and the base station in which the handover preparation operation is to be performed, a handover request signaling is sent to the base station in which the handover preparation operation is to be performed through the X2 interface connection.

In step 302, a response signaling of the base station in which the handover preparation operation is to be performed is monitored, and step 303 or step 304 is performed.

In step 303, if a handover request confirmation signaling is monitored, it is determined that the handover preparation is successful, and the base station in which the handover preparation operation is to be performed is determined as the candidate base station that has completed the handover preparation.

In step 304, if the handover preparation failure signaling is monitored, it is determined that the handover preparation fails.

In one embodiment, in step 301 to step 304, the source base station may directly send the HANDOVER REQUEST signaling to the base station in which the handover preparation operation is to be performed through the X2 interface connection, and when a HANDOVER REQUEST ACKNOWLEDGE signaling returned by the base station based on the handover request is monitored, it is determined that the handover preparation is successful, the base station that has successfully performed the handover preparation is determined as the candidate base station that has completed the handover preparation, and added to the handover candidate base station set. If a HANDOVER PREPARATION FAILURE is monitored, it is determined that the handover preparation fails.

In this embodiment, it discloses a method for implementing handover preparation and determining the candidate base station when there is an interface between the source base station and the base station in which the handover preparation operation is to be performed.

FIG. 4 is a flow chart showing yet another method for unmanned aerial vehicle handover according to an embodiment. In this embodiment, by using the above method provided by the embodiment of the present disclosure, an exemplary description will be provided as an example of how the source base station performs the handover preparation on the base station in which the handover preparation operation is to be performed, having an interface between base stations. As shown in FIG. 4, the method includes the following steps.

In step 401, if there is no X2 interface connection between the source base station and the base station in which the handover preparation operation is to be performed, a handover required signaling for handing over to the base station in which the handover preparation operation is to be performed is sent to a mobility management entity through an S1 interface.

In step 402, a response signaling returned by the mobility management entity based on the handover required signaling is monitored, and step 403 or step 404 is performed.

In step 403, if a command handover signaling is monitored, it is determined that the handover preparation is successful, and the base station in which the handover preparation operation is to be performed is determined as the candidate base station that has completed the handover preparation.

In step 404, if the handover preparation failure signaling is monitored, it is determined that the handover preparation fails.

In one embodiment, in steps 401 to 404, the source base station sends the HANDOVER REQUIRED signaling to the MME through the S1 interface, the MME sends HANDOVER REQUEST signaling to the base station in which the handover preparation operation is to be performed. the base station in which the handover preparation operation is to be performed sends a handover request response signaling (HANDOVER REQUEST ACKNOWLEDGE signaling) to the MME after the base station in which the handover preparation operation is to be performed allocates all necessary carrying resources for the unmanned aerial vehicle based on the HANDOVER REQUEST signaling, and then the MME sends a HANDOVER COMMAND signaling to the source base station, so that the source base station may determine that handover is successful, and determine the base station that has successfully performed the handover preparation as a candidate base station that has completed handover preparation, and add the candidate base station to the handover candidate base station set, and if the HANDOVER PREPARATION FAILURE signaling is monitored, the handover preparation failure is determined.

In this embodiment, it discloses a method for implementing handover preparation and determining the candidate base station when there is no interface between the source base station and the base station in which the handover preparation operation is to be performed.

Figure 5:
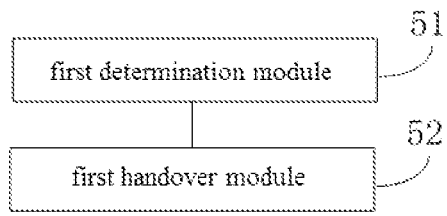
FIG. 5 is a block diagram showing a device for unmanned aerial vehicle handover according to an embodiment.

FIG. 5 is a block diagram showing a device for unmanned aerial vehicle handover, which is applied to a source base station, according to an embodiment. As shown in FIG. 5, the device for unmanned aerial vehicle handover includes:

a first determination module 51 configured to determine whether a candidate base station that has completed a handover preparation exists in the base stations meeting the handover conditions, when base stations meeting handover conditions are determined based on a measurement report sent by an unmanned aerial vehicle; and a first handover module 52 configured to hand over the unmanned aerial vehicle to the candidate base station meeting the handover conditions, the first determination module 51 determines that when the candidate base station that has completed the handover preparation exists in the base stations meeting the handover conditions.

Figure 6:
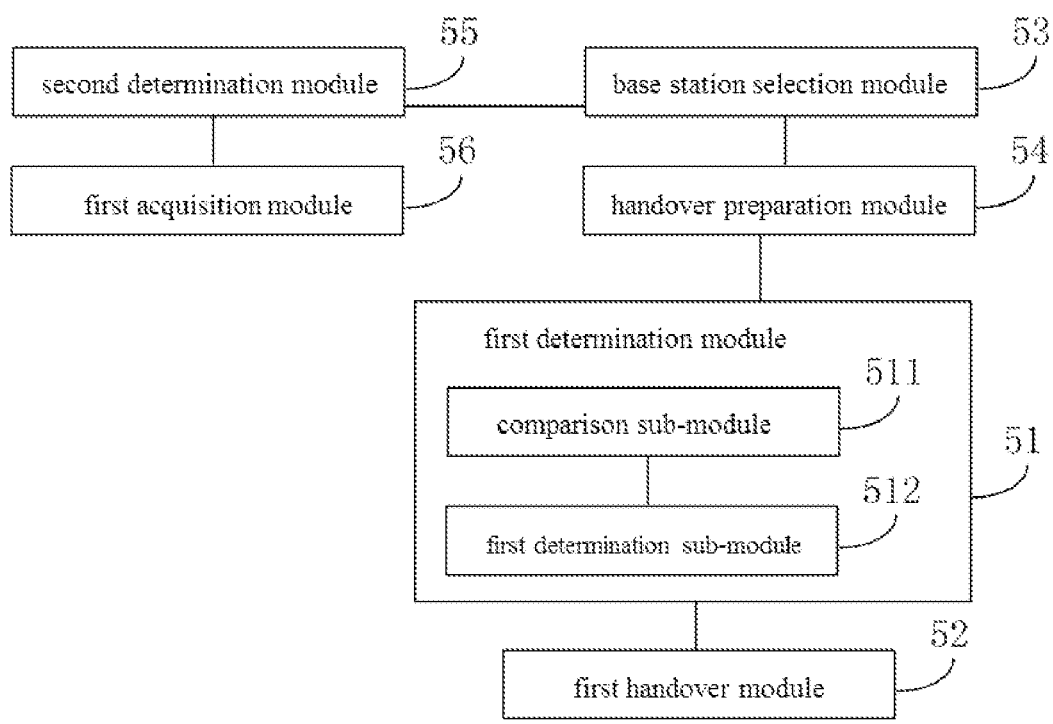
FIG. 6 is a block diagram showing another device for unmanned aerial vehicle handover according to an embodiment.

FIG. 6 is a block diagram showing another device for unmanned aerial vehicle handover according to an embodiment. As shown in FIG. 6, and based on the embodiment shown in FIG. 5, in an embodiment, the first determination module 51 includes:

a comparison sub-module 511, which is configured to determine whether any of the base stations meeting the handover conditions is located in a handover candidate base station set, wherein base stations in the handover candidate base station set are the base stations that have completed the handover preparation; and a first determination sub-module 512, which is configured to determine that the candidate base station that has completed handover preparation exists in the base stations meeting the handover conditions if any of the base stations meeting the handover conditions is located in the handover candidate base station set.

In one embodiment, the device further includes:

a base station selection module 53, which is configured to select a base station in which a handover preparation operation is to be performed from accessible base stations based on a flight speed and/or a flight altitude of the unmanned aerial vehicle, wherein the accessible base station is a base station that is able to be accessed when the unmanned aerial vehicle flies according to a flight path; and a handover preparation module 54, which is configured to perform the handover preparation operation for handing over to the base station in which the handover preparation operation is to be performed, and determine the base station that has successfully performed the handover preparation as a candidate base station that has completed the handover preparation.

In one embodiment, the device further includes:

a second determination module 55, which is configured to determine the accessible base stations based on the flight path of the unmanned aerial vehicle and geographical location information of the base station.

In one embodiment, the device further includes:
a first acquisition 56 module, which is configured to interact the geographical location information of the base station with adjacent base stations, based on interfaces between the base stations; or acquire the geographical location information of each of the adjacent base stations from a core network equipment; or inquire the geographical location information of each of the adjacent base stations through a network management system of an operator.

Figure 7:
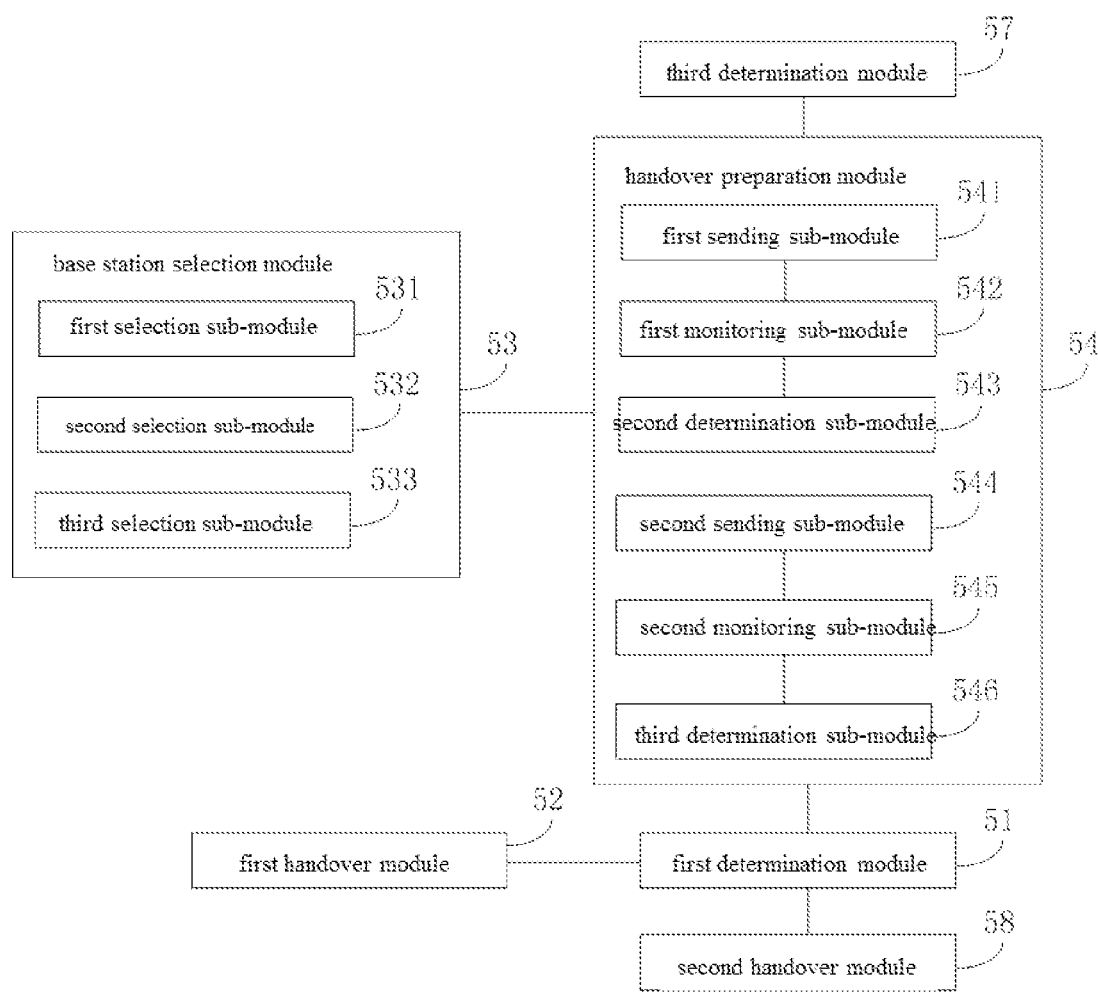
FIG. 7 is a block diagram showing still another device for unmanned aerial vehicle handover according to an embodiment.

FIG. 7 is a block diagram of still another device for unmanned aerial vehicle handover according to an embodiment. As shown in FIG. 7, and based on the above embodiments shown in FIG. 5 and/or FIG. 6, in an embodiment, the handover preparation module 54 includes:
a first sending sub-module 541, which is configured to send a handover request signaling to the base station in which the handover preparation operation is to be performed through an X2 interface connection if there is the X2 interface connection between the source base station and the base station in which the handover preparation operation is to be performed;
a first monitoring sub-module 542, which is configured to monitor a response signaling of the base station in which the handover preparation operation is to be performed; and
a second determination sub-module 543, which is configured to determine that the handover preparation is successful, and determine the base station in which the handover preparation operation is to be performed as the candidate base station that has completed the handover preparation, if a handover request confirmation signaling is monitored.

In one embodiment, the handover preparation module 54 includes:
a second sending sub-module 544, which is configured to send a handover request signaling for handing over to the base station in which the handover preparation operation is to be performed to a mobility management entity through an S1 interface if there is no X2 interface connection between the source base station and the base station in which the handover preparation operation is to be performed;
a second monitoring sub-module 545, which is configured to monitor a response signaling returned by the mobility management entity based on the handover required signaling; and
a third determination sub-module 546, which is configured to determine that the handover preparation is successful, and determine the base station in which the handover preparation operation is to be performed as the candidate base station that has completed the handover preparation, if a command handover signaling is monitored.

In one embodiment, the device further includes:
a third determination module 57, which is configured to determine that the handover preparation fails if the handover preparation failure signaling is monitored.

In one embodiment, the base station selection module 53 includes:
a first selection sub-module 531, which is configured to determine a number of base stations in which the handover preparation operation is to be performed as a first number based on the flight speed of the unmanned aerial vehicle, and select the first number of base stations in which the handover preparation operation is to be performed as the base stations in which the handover preparation operation is to be performed from the accessible base stations; or
a second selection sub-module 532, which is configured to determine a number of base stations in which the handover preparation operation is to be performed as a second number based on the flight altitude of the unmanned aerial vehicle, and select the second number of base stations in which the handover preparation operation is to be performed as the base stations in which the handover preparation operation is to be performed from the accessible base stations; or
a third selection sub-module 533, which is configured to determine a number of base stations in which the handover preparation operation is to be performed as a third number based on the flight speed and the flight altitude of the unmanned aerial vehicle, and select the third number of base stations in which the handover preparation operation is to be performed as the base stations in which the handover preparation operation is to be performed from the accessible base stations.

In one embodiment, the device further includes:
a second handover module 58, which is configured to send a handover request signaling to one of the base stations meeting the handover conditions when no candidate base station that has completed the handover preparation exists in the base stations meeting the handover conditions.

With regard to the device in above embodiments, the specific manners in which each module performs operation have been described in detail in the embodiments related to the method, and will not be described in detail herein.

Figure 8:
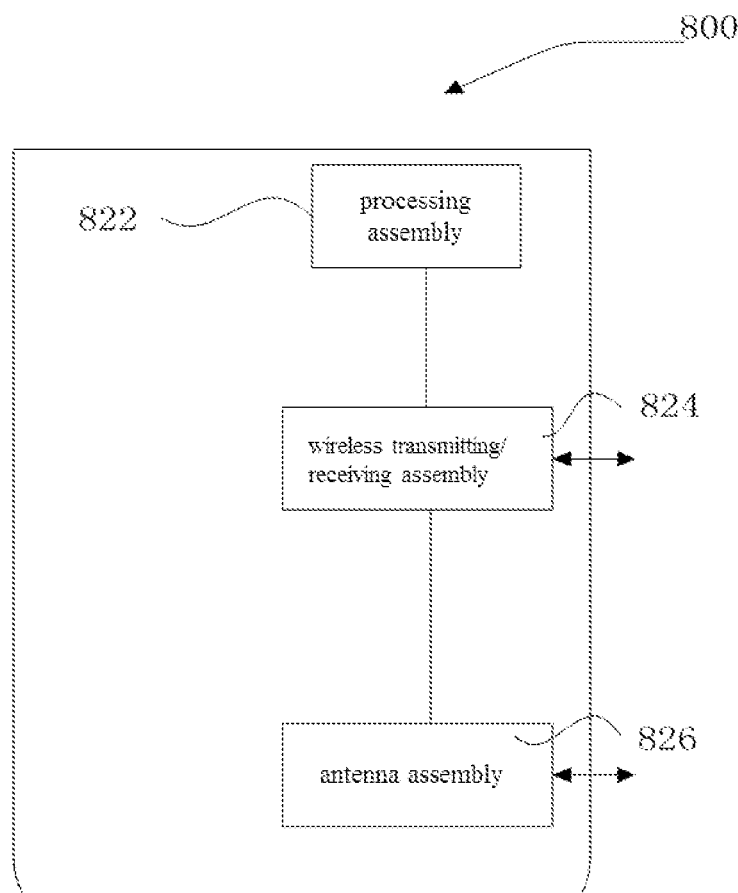
FIG. 8 is a block diagram showing a device applied to an unmanned aerial vehicle handover according to an embodiment.

FIG. 8 is a block diagram showing a device applied to an unmanned aerial vehicle handover according to an embodiment. The device 800 may be provided as a base station or a core network equipment. Referring to FIG. 8, the device 800 includes a processing assembly 822, a wireless transmitting/receiving assembly 824, an antenna assembly 826, and a signal processing portion specific to a wireless interface, and the processing assembly 822 may further include one or more processors.

One of processors in the processing assembly 822 may be configured to perform the method for unmanned aerial vehicle handover described in the first aspect mentioned above.

In an embodiment, it further provides a non-transitory computer readable storage medium including instructions. The instructions are executable by the processing assembly 822 of the device 800 to perform the method described in the first or third aspect mentioned above. For example, the non-transitory computer readable storage medium may be a ROM, a Random Access Memory (RAM), a CD-ROM, a magnetic tape, a soft disk, an optical data storage device, and the like.

In one embodiment, the method further includes:
selecting a base station in which a handover preparation operation is to be performed from accessible base stations based on a flight speed and/or a flight altitude of the unmanned aerial vehicle, wherein the accessible base station is a base station that the unmanned aerial vehicle is able to access when flying according to a flight path; and
performing the handover preparation operation for handing over to the base station in which the handover preparation operation is to be performed, and determining the base station that has successfully performed the handover preparation as a candidate base station that has completed the handover preparation.

In one embodiment, the method further includes:
determining the accessible base stations based on the flight path of the unmanned aerial vehicle and geographical location information of the base station.

In one embodiment, the method further includes:
interacting the geographical location information of the base station with adjacent base stations, based on interfaces between the base stations; or
acquiring the geographical location information of each of the adjacent base stations from a core network equipment; or
inquiring the geographical location information of each of the adjacent base stations through a network management system of an operator.

In one embodiment, performing the handover preparation operation for handing over to the base station in which the handover preparation operation is to be performed, and determining the base station that has successfully performed the handover preparation as the candidate base station that has completed the handover preparation, includes:
if there is an X2 interface connection between the source base station and the base station in which the handover preparation operation is to be performed, sending a handover request signaling to the base station in which the handover preparation operation is to be performed through the X2 interface connection;
monitoring a response signaling of the base station in which the handover preparation operation is to be performed;
if a handover request confirmation signaling is monitored, determining that the handover preparation is successful, and determining the base station in which the handover preparation operation is to be performed as the candidate base station that has completed the handover preparation.

In one embodiment, performing the handover preparation operation for handing over to the base station in which the handover preparation operation is to be performed, and determining the base station that has successfully performed the handover preparation as a candidate base station that has completed the handover preparation, includes:
if there is no X2 interface connection between the source base station and the base station in which the handover preparation operation is to be performed, a handover required signaling for handing over to the base station in which the handover preparation operation is to be performed is sent to a mobility management entity through an S1 interface;
monitoring a response signaling returned by the mobility management entity based on the handover required signaling;
if a command handover signaling is monitored, determining that the handover preparation is successful, and determining the base station in which the handover preparation operation is to be performed as the candidate base station that has completed the handover preparation.

In one embodiment, the method further includes:
if the handover preparation failure signaling is monitored, determining that the handover preparation fails.

In one embodiment, selecting a base station in which a handover preparation operation is to be performed from accessible base stations based on a flight speed and/or a flight altitude of the unmanned aerial vehicle, includes:

determining a number of base stations in which the handover preparation operation is to be performed as a first number based on the flight speed of the unmanned aerial vehicle, and selecting the first number of base stations in which the handover preparation operation is to be performed as the base stations in which the handover preparation operation is to be performed from the accessible base stations; or
determining a number of base stations in which the handover preparation operation is to be performed as a second number based on the flight altitude of the unmanned aerial vehicle, and selecting the second number of base stations in which the handover preparation operation is to be performed as the base stations in which the handover preparation operation is to be performed from the accessible base stations; or
determining a number of base stations in which the handover preparation operation is to be performed as a third number based on the flight speed and the flight altitude of the unmanned aerial vehicle, and selecting the third number of base stations in which the handover preparation operation is to be performed as the base stations in which the handover preparation operation is to be performed from the accessible base stations.

In one embodiment, the method further includes:
when there is no candidate base station that has completed the handover preparation existed among the base stations meeting the handover conditions, sending a handover request signaling to one of the base stations meeting the handover conditions.

In one embodiment, the first determination module includes:
a comparison sub-module configured to determine whether any of the base stations meeting the handover conditions is in a handover candidate base station set, wherein base stations in the handover candidate base station set have completed the handover preparation; and
a first determination sub-module configured to determine that there is a candidate base station that has completed handover preparation existed among the base stations meeting the handover conditions, if any of the base stations meeting the handover conditions is in the handover candidate base station set.

In one embodiment, the device further includes:
a base station selection module configured to select a base station in which a handover preparation operation is to be performed from accessible base stations based on a flight speed and/or a flight altitude of the unmanned aerial vehicle, wherein the accessible base station is a base station that the unmanned aerial vehicle is able to access when flying according to a flight path; and
a handover preparation module configured to perform the handover preparation operation for handing over to the base station in which the handover preparation operation is to be performed, and determine the base station that has successfully performed the handover preparation as a candidate base station that has completed the handover preparation.

In one embodiment, the device further includes:
a second determination module configured to determine the accessible base stations based on the flight path of the unmanned aerial vehicle and the geographical location information of the base station.

In one embodiment, the device further includes:
a first acquisition module configured to interact the geographical location information of the base station with adjacent base stations, based on interfaces between the base stations; or acquire the geographical location information of each of the adjacent base stations from a core network equipment; or inquire the geographical location information of each of the adjacent base stations through a network management system of an operator.

In one embodiment, the handover preparation module includes:
a first sending sub-module configured to send a handover request signaling to the base station in which the handover preparation operation is to be performed through an X2 interface connection, if there is the X2 interface connection between the source base station and the base station in which the handover preparation operation is to be performed;
a first monitoring sub-module configured to monitor a response signaling of the base station in which the handover preparation operation is to be performed; and
a second determination sub-module configured to determine that the handover preparation is successful, and determine the base station in which the handover preparation operation is to be performed as the candidate base station that has completed the handover preparation, if a handover request confirmation signaling is monitored.

In one embodiment, the handover preparation module includes:
a second sending sub-module configured to send a handover required signaling for handing over to the base station in which the handover preparation operation is to be performed to a mobility management entity through an S1 interface, if there is no X2 interface connection between the source base station and the base station in which the handover preparation operation is to be performed;
a second monitoring sub-module configured to monitor a response signaling returned by the mobility management entity based on the handover required signaling; and
a third determination sub-module configured to determine that the handover preparation is successful, and determine the base station in which the handover preparation operation is to be performed as the candidate base station that has completed the handover preparation, if a command handover signaling is monitored.

In one embodiment, the device further includes:
a third determination module configured to determine that the handover preparation fails if the handover preparation failure signaling is monitored.

In one embodiment, the base station selection module includes:
a first selection sub-module configured to determine a number of base stations in which the handover preparation operation is to be performed as a first number based on the flight speed of the unmanned aerial vehicle, and select the first number of base stations in which the handover preparation operation is to be performed as the base stations in which the handover preparation operation is to be performed from the accessible base stations; or
a second selection sub-module configured to determine a number of base stations in which the handover preparation operation is to be performed as a second number based on the flight altitude of the unmanned aerial vehicle, and select the second number of base stations in which the handover preparation operation is to be performed as the base stations in which the handover preparation operation is to be performed from the accessible base stations; or
a third selection sub-module configured to determine a number of base stations in which the handover preparation operation is to be performed as a third number based on the flight speed and the flight altitude of the unmanned aerial vehicle, and select the third number of base stations in which the handover preparation operation is to be performed as the base stations in which the handover preparation operation is to be performed from the accessible base stations.

In one embodiment, the device further includes:
a second handover module configured to send a handover request signaling to one of the base stations meeting the handover conditions when no candidate base station that has completed the handover preparation exists in the base stations meeting the handover conditions.

Other embodiments of the disclosure will be apparent to those skilled in the art from consideration of the specification and practice of the disclosure disclosed herein. This application is intended to cover any variations, uses, or adaptations of the disclosure following, in general, the principles of the disclosure and including such departures from the present disclosure as come within known or customary practice in the art to which the disclosure pertains. It is intended that the specification and examples be considered as exemplary only, with a true scope and spirit of the disclosure being indicated by the following claims.

It will be understood that the present disclosure is not limited to the precise arrangements that have been described above and shown in the drawings, and may be modified and changed without departing from the scope thereof. The scope of the present disclosure is limited only by the appended claims.

What is claimed is:

1. A method for unmanned aerial vehicle handover, comprising:
determining, by a source base station, that one or more base stations meet one or more handover conditions based on a measurement report from an unmanned aerial vehicle;
determining, by the source base station, a candidate base station that has completed a handover preparation among the one or more base stations meeting the one or more handover conditions;
handing over, by the source base station, the unmanned aerial vehicle to the candidate base station meeting the one or more handover conditions;
determining, by the source base station, one or more accessible base stations based on a flight path of the unmanned aerial vehicle and geographical location information of the one or more accessible base stations;
selecting, by the source base station, a base station from the one or more accessible base stations based on a flight speed, a flight altitude, or the flight speed and the flight altitude of the unmanned aerial vehicle, wherein the selected base station is to perform a handover preparation operation, and the accessible base station is a base station that the unmanned aerial vehicle is able to access when flying according to the flight path;
performing, by the source base station, a handover preparation operation for handing over the base station that is to perform the handover preparation operation; and determining, by the source base station, the base station that has successfully performed the handover preparation as the candidate base station that has completed the handover preparation.

2. The method of claim 1, wherein determining, by the source base station, whether there is the candidate base station that has completed the handover preparation among the one or more base stations meeting the one or more handover conditions comprises:
    determining, by the source base station, whether any of the one or more base stations meeting the one or more handover conditions is in a handover candidate base station set, wherein the handover candidate base station set includes one or more base stations that have completed the handover preparation;
    determining, by the source base station, that there is a base station meeting the one or more handover conditions in the handover candidate base station set; and
    determining, by the source base station, that the base station is the candidate base station that has completed the handover preparation among the one or more base stations meeting the one or more handover conditions.

3. The method of claim 1, further comprises:
    interacting, based on an interface between a base station and adjacent base stations, the geographical location information of the base station with the adjacent base station; or
    acquiring the geographical location information of each of the adjacent base stations from a core network equipment; or
    inquiring the geographical location information of each of the adjacent base stations through a network management system of an operator.

4. The method of claim 1, wherein performing, by the source base station, the handover preparation operation for handing over the base station that is to perform the handover preparation operation, and determining, by the source base station, the base station that has successfully performed the handover preparation as the candidate base station that has completed the handover preparation comprises:
    sending, by the source base station, a handover request signaling to the base station that is to perform the handover preparation operation through an X2 interface connection, wherein the X2 interface connection is between the source base station and the base station that is to perform the handover preparation operation;
    monitoring, by the source base station, a response signaling of the base station that is to perform the handover preparation operation;
    determining, by the source base station, a handover request confirmation signaling monitored;
    determining, by the source base station, that the handover preparation is successful; and
    determining, by the source base station, the base station that is to perform the handover preparation operation as the candidate base station that has completed the handover preparation.

5. The method of claim 4, further comprising:
    determining, by the source base station, a handover preparation failure signaling monitored;
    determining, by the source base station, that the handover preparation fails.

6. The method of claim 1, wherein selecting, by the source base station, the base station from the one or more accessible base stations based on the flight speed, the flight altitude, or the flight speed and the flight altitude of the unmanned aerial vehicle comprises one of followings:
    determining, by the source base station, a number of base stations that are to perform the handover preparation operation as a first number based on the flight speed of the unmanned aerial vehicle, and selecting, by the source base station, the first number of base stations that are to perform the handover preparation operation as the base stations that are to perform the handover preparation operation from the one or more accessible base stations;
    determining, by the source base station, a number of base stations that are to perform the handover preparation operation as a second number based on the flight altitude of the unmanned aerial vehicle, and selecting, by the source base station, the second number of base stations that are to perform the handover preparation operation as the base stations that are to perform the handover preparation operation from the one or more accessible base stations; or
    determining, by the source base station, a number of base stations that are to perform the handover preparation operation as a third number based on the flight speed and the flight altitude of the unmanned aerial vehicle, and selecting, by the source base station, the third number of base stations that are to perform the handover preparation operation as the base stations that are to perform the handover preparation operation from the one or more accessible base stations.

7. The method of claim 1, further comprising:
    determining, by the source base station, that there is no candidate base station that has completed the handover preparation among the one or more base stations meeting the one or more handover conditions; and
    sending, by the source base station, a handover request signaling to one of the base stations meeting the one or more handover conditions.

8. A base station, comprising:
    one or more processors;
    a non-transitory storage coupled to the one or more processors; and
    a plurality of programs stored in the non-transitory storage that, when executed by the one or more processors, cause the base station to perform acts comprising:
    determining that one or more base stations meet one or more handover conditions based on a measurement report sent by an unmanned aerial vehicle;
    determining a candidate base station that has completed a handover preparation among the one or more base stations meeting the one or more handover conditions;
    handing over the unmanned aerial vehicle to the candidate base station meeting the one or more handover conditions;
    determining one or more accessible base stations based on a flight path of the unmanned aerial vehicle and geographical location information of the one or more accessible base stations;
    selecting a base station from the one or more accessible base stations based on a flight speed, a flight altitude, or the flight speed and the flight altitude of the unmanned aerial vehicle, wherein the selected base station is to perform a handover preparation operation, and the accessible base station is a base station that the unmanned aerial vehicle is able to access when flying according to the flight path;
    performing a handover preparation operation for handing over the base station that is to perform the handover preparation operation; and determining the base station that has successfully performed the handover preparation as the candidate base station that has completed the handover preparation.

9. The base station of claim 8, wherein determining whether there is the candidate base station that has completed the handover preparation among the one or more base stations meeting the one or more handover conditions comprises:
   determining whether any of the one or more base stations meeting the one or more handover conditions is in a handover candidate base station set, wherein the handover candidate base station set includes one or more base stations that have completed the handover preparation;
   determining that there is a base station meeting the one or more handover conditions in the handover candidate base station set; and
   determining that the base station is the candidate base station that has completed the handover preparation among the one or more base stations meeting the one or more handover conditions.

10. The base station of claim 8, wherein the plurality of programs cause the base station to perform acts further comprising:
   interacting, based on an interface between a base station and adjacent base stations, the geographical location information of the base station with the adjacent base station; or
   acquiring the geographical location information of each of the adjacent base stations from a core network equipment; or
   inquiring the geographical location information of each of the adjacent base stations through a network management system of an operator.

11. The base station of claim 8, wherein performing the handover preparation operation for handing over the base station that is to perform the handover preparation operation, and determining the base station that has successfully performed the handover preparation as the candidate base station that has completed the handover preparation comprises:
   sending a handover request signaling to the base station that is to perform the handover preparation operation through an X2 interface connection, wherein the X2 interface connection is between the source base station and the base station that is to perform the handover preparation operation;
   monitoring a response signaling of the base station that is to perform the handover preparation operation;
   determining a handover request confirmation signaling monitored;
   determining that the handover preparation is successful; and
   determining the base station that is to perform the handover preparation operation as the candidate base station that has completed the handover preparation.

12. The base station of claim 11, wherein the plurality of programs cause the base station to perform acts further comprising:
   determining a handover preparation failure signaling monitored; and
   determining that the handover preparation fails.

13. The base station of claim 8, wherein selecting the base station from the one or more accessible base stations based on the flight speed, the flight altitude, or the flight speed and the flight altitude of the unmanned aerial vehicle comprises one of followings:
   determining a number of base stations that are to perform the handover preparation operation as a first number based on the flight speed of the unmanned aerial vehicle, and selecting the first number of base stations that are to perform the handover preparation operation as the base stations that are to perform the handover preparation operation from the one or more accessible base stations;
   determining a number of base stations that are to perform the handover preparation operation as a second number based on the flight altitude of the unmanned aerial vehicle, and selecting the second number of base stations that are to perform the handover preparation operation as the base stations that are to perform the handover preparation operation from the one or more accessible base stations; or
   determining a number of base stations that are to perform the handover preparation operation as a third number based on the flight speed and the flight altitude of the unmanned aerial vehicle, and selecting the third number of base stations that are to perform the handover preparation operation as the base stations that are to perform the handover preparation operation from the one or more accessible base stations.

14. The base station of claim 8, wherein the plurality of programs cause the base station to perform acts further comprising:
   determining that there is no candidate base station that has completed the handover preparation among the one or more base stations meeting the one or more handover conditions; and
   sending a handover request signaling to one of the base stations meeting the one or more handover conditions.

15. A non-transitory computer readable storage medium storing a plurality of programs for execution by a base station having one or more processors, wherein the plurality of programs, when executed by the one or more processors, cause the base station to perform acts comprising:
   determining that one or more base stations meet one or more handover conditions based on a measurement report sent by an unmanned aerial vehicle;
   determining a candidate base station that has completed a handover preparation among the one or more base stations meeting the one or more handover conditions;
   handing over the unmanned aerial vehicle to the candidate base station meeting the one or more handover conditions;
   determining one or more accessible base stations based on a flight path of the unmanned aerial vehicle and geographical location information of the one or more accessible base stations;
   selecting a base station from the one or more accessible base stations based on a flight speed, a flight altitude, or the flight speed and the flight altitude of the unmanned aerial vehicle, wherein the selected base station is to perform a handover preparation operation, and the accessible base station is a base station that the unmanned aerial vehicle is able to access when flying according to the flight path;
   performing a handover preparation operation for handing over the base station that is to perform the handover preparation operation; and
   determining the base station that has successfully performed the handover preparation as the candidate base station that has completed the handover preparation.

16. The non-transitory computer readable storage medium of claim 15, wherein determining whether there is the candidate base station that has completed the handover preparation among the one or more base stations meeting the one or more handover conditions comprises:

determining whether any of the one or more base stations meeting the one or more handover conditions is in a handover candidate base station set, wherein the handover candidate base station set includes one or more base stations that have completed the handover preparation;

determining that there is a base station meeting the one or more handover conditions in the handover candidate base station set; and determining that the base station is the candidate base station that has completed the handover preparation among the one or more base stations meeting the one or more handover conditions.

17. The non-transitory computer readable storage medium of claim 15, wherein the plurality of programs cause the base station to perform acts further comprising:

interacting, based on an interface between a base station and adjacent base stations, the geographical location information of the base station with the adjacent base station; or acquiring the geographical location information of each of the adjacent base stations from a core network equipment; or inquiring the geographical location information of each of the adjacent base stations through a network management system of an operator.

18. The non-transitory computer readable storage medium of claim 15, wherein performing the handover preparation operation for handing over the base station that is to perform the handover preparation operation, and determining the base station that has successfully performed the handover preparation as the candidate base station that has completed the handover preparation comprises:

sending a handover request signaling to the base station that is to perform the handover preparation operation through an X2 interface connection, wherein the X2 interface connection is between the source base station and the base station that is to perform the handover preparation operation;

monitoring a response signaling of the base station that is to perform the handover preparation operation;

determining a handover request confirmation signaling monitored;

determining that the handover preparation is successful; and determining the base station that is to perform the handover preparation operation as the candidate base station that has completed the handover preparation.

19. The non-transitory computer readable storage medium of claim 18, wherein the plurality of programs cause the base station to perform acts further comprising:

determining a handover preparation failure signaling monitored; and determining that the handover preparation fails.

20. The non-transitory computer readable storage medium of claim 15, wherein selecting the base station from the one or more accessible base stations based on the flight speed, the flight altitude, or the flight speed and the flight altitude of the unmanned aerial vehicle comprises one of followings:

determining a number of base stations that are to perform the handover preparation operation as a first number based on the flight speed of the unmanned aerial vehicle, and selecting the first number of base stations that are to perform the handover preparation operation as the base stations that are to perform the handover preparation operation from the one or more accessible base stations;

determining a number of base stations that are to perform the handover preparation operation as a second number based on the flight altitude of the unmanned aerial vehicle, and selecting the second number of base stations that are to perform the handover preparation operation as the base stations that are to perform the handover preparation operation from the one or more accessible base stations; or determining a number of base stations that are to perform the handover preparation operation as a third number based on the flight speed and the flight altitude of the unmanned aerial vehicle, and selecting the third number of base stations that are to perform the handover preparation operation as the base stations that are to perform the handover preparation operation from the one or more accessible base stations.

\* \* \* \* \*